United States Patent
O'Donnell et al.

(10) Patent No.: US 6,381,642 B1
(45) Date of Patent: Apr. 30, 2002

(54) IN-BAND METHOD AND APPARATUS FOR REPORTING OPERATIONAL STATISTICS RELATIVE TO THE PORTS OF A FIBRE CHANNEL SWITCH

(75) Inventors: Michael E. O'Donnell, Westminster, CO (US); Robert John Gallagher, Hurley; Peter Holmes, Poughkeepsie, both of NY (US); Harry Morris Yudenfriend, Poughkeepsie, NY (US)

(73) Assignees: McDATA Corporation, Broomfield, CO (US); International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,574

(22) Filed: Oct. 21, 1999

(51) Int. Cl.⁷ ............................................. G06F 15/173
(52) U.S. Cl. ........................................ 709/224; 710/16
(58) Field of Search ............................. 710/316, 15–19; 709/224; 370/257

(56) References Cited

U.S. PATENT DOCUMENTS

| | | | | |
|---|---|---|---|---|
| 5,226,120 A | * | 7/1993 | Brown et al. ................ | 345/969 |
| 5,497,460 A | * | 3/1996 | Bailey et al. ................ | 370/258 |
| 5,684,959 A | * | 11/1997 | Bhat et al. ................... | 370/258 |
| 5,822,305 A | * | 10/1998 | Vaishnavi et al. .......... | 370/252 |
| 6,049,828 A | * | 4/2000 | Dev et al. .................... | 709/220 |
| 6,098,109 A | * | 8/2000 | Kotzur et al. ............... | 370/911 |
| 6,130,703 A | * | 10/2000 | Spriester et al. ............ | 348/192 |
| 6,148,002 A | * | 11/2000 | Patel et al. .................. | 370/438 |
| 6,160,813 A | | 12/2000 | Banks et al. | |
| 6,195,703 B1 | | 2/2001 | Blumenau et al. | |
| 6,216,160 B1 | * | 4/2001 | Dichter ........................ | 709/220 |
| 6,219,701 B1 | | 4/2001 | Hirata et al. | |
| 6,230,073 B1 | * | 5/2001 | Kofman et al. ............... | 118/13 |
| 6,272,113 B1 | * | 8/2001 | McIntyre et al. ............ | 370/242 |
| 6,275,864 B1 | * | 8/2001 | Mancusi et al. ............. | 709/220 |

\* cited by examiner

*Primary Examiner*—Paul R. Myers
(74) *Attorney, Agent, or Firm*—William J. Kubida, Esq.; Hogan & Hartson, LLP (57) ABSTRACT

An in-band method/apparatus whereby a host is enabled to secure predetermined operational information relative to predetermined ports of a fiber channel switch. A set command is generated at the host and sent in-band to the switch. The information content of the set command defines the ports for which operational-parameters are to be monitored. The information content of the set command also defines which operational parameters are to be monitored. In response to receiving the set command, the switch establishes statistical counters for monitoring port operational parameters in accordance with received operational parameter identifiers. An accept signal is then sent in-band to the host, and a time period of port monitoring begins. After a predefined time period has expired, the host sends a read command in-band to the switch. The switch now generates a monitor record in accordance with the count content of the statistical counters that were established in response to the set command. This monitor record contains one port field for each of the ports that were specified by the set command, and each of the port fields contains one or more count fields that contain port operational count data for the port operational parameters that were specified by the set command. The monitor record is then sent in-band to the host. Recycling of the timed process may be provided.

24 Claims, 3 Drawing Sheets

IN-BAND METHOD AND APPARATUS FOR REPORTING OPERATIONAL STATISTICS RELATIVE TO THE PORTS OF A FIBRE CHANNEL SWITCH

BACKGROUND OF THE INVENTION

1. Field of the Invention

The present invention relates to methods and apparatus having utility in switched data communication, and more particularly, to methods and apparatus for measuring operational parameters such as words received and/or words transmitted by the ports of a fibre channel switch (FC switch).

2. Description of the Related Art

The fibre channel standard is a high-performance serial interconnect standard that is designed for bi-directional, point-to-point communication between devices, such as servers, storage systems, workstations, switches, and hubs. The FC standard offers a variety of benefits over other link level protocols, including efficiency, high performance, scalability, simplicity, ease of use and installation, and support for popular high level protocols.

Fibre channel employs a topology known as a "fabric" to establish connections, or paths, between ports. A fabric is a network of one or more FC switches for interconnecting a plurality of devices without restriction as to the manner in which the FC switch, or switches, can be arranged. A fabric can also include a mixture of point to point and arbitrated loop topologies.

In fibre channel, a path is established between two nodes, where the path's primary task is to transport data, in-band from one point to another at high speed with low latency, while performing only simple error detection. FC switches provide flexible circuit/packet switched topology by establishing multiple simultaneous point-to-point connections. Because these connections are managed by the FC switches, or "fabric elements" rather than by the connected end devices or "nodes", in-band fabric traffic management is greatly simplified from the perspective of the end devices.

A fibre channel fabric device, including its node port or "N_port", is connected to the fabric connection by way of an F_port. The N_port establishes a connection to a fabric element (e.g., a FC switch) that has a fabric port or a F_port. FC switches also include expansion ports, known as E_ports, that interconnect to other FC switches.

Devices attached to the fabric require only enough intelligence to manage the connection between an N_port and a F_port. Fabric elements include the intelligence to handle routing, error detection and recovery and similar management functions.

A FC switch is a multi-port device where each F_port manages a simple point-to-point connection between itself and its attached device or system. Each F_port can be attached to one of a number of different devices, including a server, a peripheral device, an I/O subsystem, a bridge, a hub, or a router. A FC switch can receive a connection request from one F_port and automatically establish a connection to another F_port. Multiple data transfers happen concurrently through the multiple F_port FC switch.

A key advantage of switched technology is that it is "non-blocking" in that once a connection is established through the FC switch, the bandwidth that is provided by that connection is not shared. Hence, the physical connection resources, such as copper wiring and fiber optic cabling, can be more efficiently managed by allowing multiple users to access the physical connection resources as needed.

Switched communication systems work most efficiently when the FC switch resources are allocated efficiently. In other words, in a multiple F_port FC switch, each of the F_ports desirably processes an equitable amount of data traffic. When one connection through the FC switch absorbs an unbalanced amount of traffic, traffic delays are caused even while the FC switch possesses unused resources (i.e., unused F_ports and connection resources). The end result of an unbalanced FC switch is unnecessary high average latency in processing traffic as caused by bottlenecked connections within the FC switch.

A system user desires knowledge about in-band data traffic that flows through a FC switch, thus enabling the user to efficiently manage the data traffic and avoid bottlenecks. A FC switch is most efficiently used if the traffic load through that FC switch is reasonably balanced. When a particular F_port is heavily used by a single host or destination, that F_port is not available to handle other traffic. Similarly, it is desirable to have knowledge about the type of data traffic flowing between a pair of F_ports.

In a fibre channel system, for example, the data traffic may comprise any of a number of FC 4 specified frame types. Knowledge of the frame type can be used to configure and reconfigure the communication network for more efficient utilization of resources.

A need exists for an in-band method and device for measuring operational parameters, such as data transmitted and data received relative to the F_ports of an FC switch.

SUMMARY OF THE INVENTION

As used herein, the term "out-of-band" relates to the use of an Ethernet-type of interface to achieve FC switch management.

As used herein, the term "in-band" relates to the native interface that a fabric, including a FC switch, provides for the transmission of data through the fabric; for example. between a host, or host client and various types of devices, such as RAID arrangements, servers and workstations.

The method and apparatus of this invention provides in-band protocols that allow a host client to specify and to retrieve specified F_port statistics, such as bandwidth, error statistics, and various other operational characteristics. The protocol includes command definitions, FC monitor information, information record formats, and statistical counter record formats.

In accordance with the invention, the F_ports of a FC switch have a number of statistical counters or port counters associated therewith. These port counters are used to monitor operational parameters, such as bandwidth, error statistics, and various operational characteristics of the associated F_port.

Conventionally, the content of these port counters would be extracted from the FC switch using out-of-band techniques, and using protocols, such as simple network management protocol or SNMP (UDP protocol), and Network Management Request/Resonse Units (NMRU). That is, in-band protocols were not provided for transferring the count content of these port counters to an external host client.

In addition, in view of the large number of statistical counters that are provided for each F_port, and in view of the large number of F_ports within each FC switch, the volume of data that is returned to a host client in accordance with the invention is efficiently handled so as not to overrun the host client ability to store the data, and so as to make efficient use of the FC switch data transfer constructs.

In accordance with this invention, an in-band method/apparatus is provided for reporting FC port operational statistics.

In accordance with this invention, a host or host client specifies the format of set monitor commands, or monitor requests that are provided to a management director that is within the FC switch. This format allows a host client program to (1) specify the number of port counters that are to be monitored, (2) identify whether external ports or an internal port are to be monitored, and (3) specifically identify the ports that are to be monitored.

In accordance with this invention, the format of monitor information records or monitor responses that are returned from the FC switch to the host client is also defined. This monitor response format specifies a sequence counting scheme that guarantees the delivery of port statistics that provide a mechanism to concatenate multiple monitor records, and that provides an identification of each multiple monitor record that is transmitted to the host client.

In accordance with this invention, the time that has elapsed since the last reading of port statistics is operative to control the method/apparatus of the invention to issue a read port statistics command to the FC switch.

In an embodiment of the invention, a host client first issues a Set Monitor Command to a management director that is within the FC switch. This Set Monitor Command specifies a range of external ports that the management director is to monitor, and then report port statistics. The Set Monitor Command also contains a list of the statistical counters that are to be monitored for each port. Once the Set Monitor Command is received, accepted, and then processed by the FC switch, the management director within the FC switch sends an accept signal to the host client indicating that monitoring of the port counters will be performed as requested by the Set Monitor Command. This accept signal can be sent via an FC 4 status signal.

Later, and at a time that is defined by the host client, a Read Port Statistics Command is issued by the host client to the management director that is within the FC switch. The management director responds to this Read Port Statistics Command, and operates to compile a list of the statistical counters per port (using the information previously supplied by the Set Monitor Command). A Monitor Information Record is then assembled by the management director, this record consisting of (1) one header record, and (2) an individual port information record and one or more statistical counter records for each of the ports that are specified by the Set Monitor Command.

This Monitor Information Record is then transmitted by the FC switch to the host client as in-band data, along with a final FC 4 status byte.

It is to be noted that the techniques above described are operable in accordance with this invention relative to any port; for example, but without limitation thereto, E_ports, F_ports and internal ports.

These and other features and advantages of the invention will be apparent to those of skill in the art upon reference to the following detailed description, which description makes reference to the drawing.

DETAILED DESCRIPTION OF THE PREFERRED EMBODIMENT

Figures 1, 2:
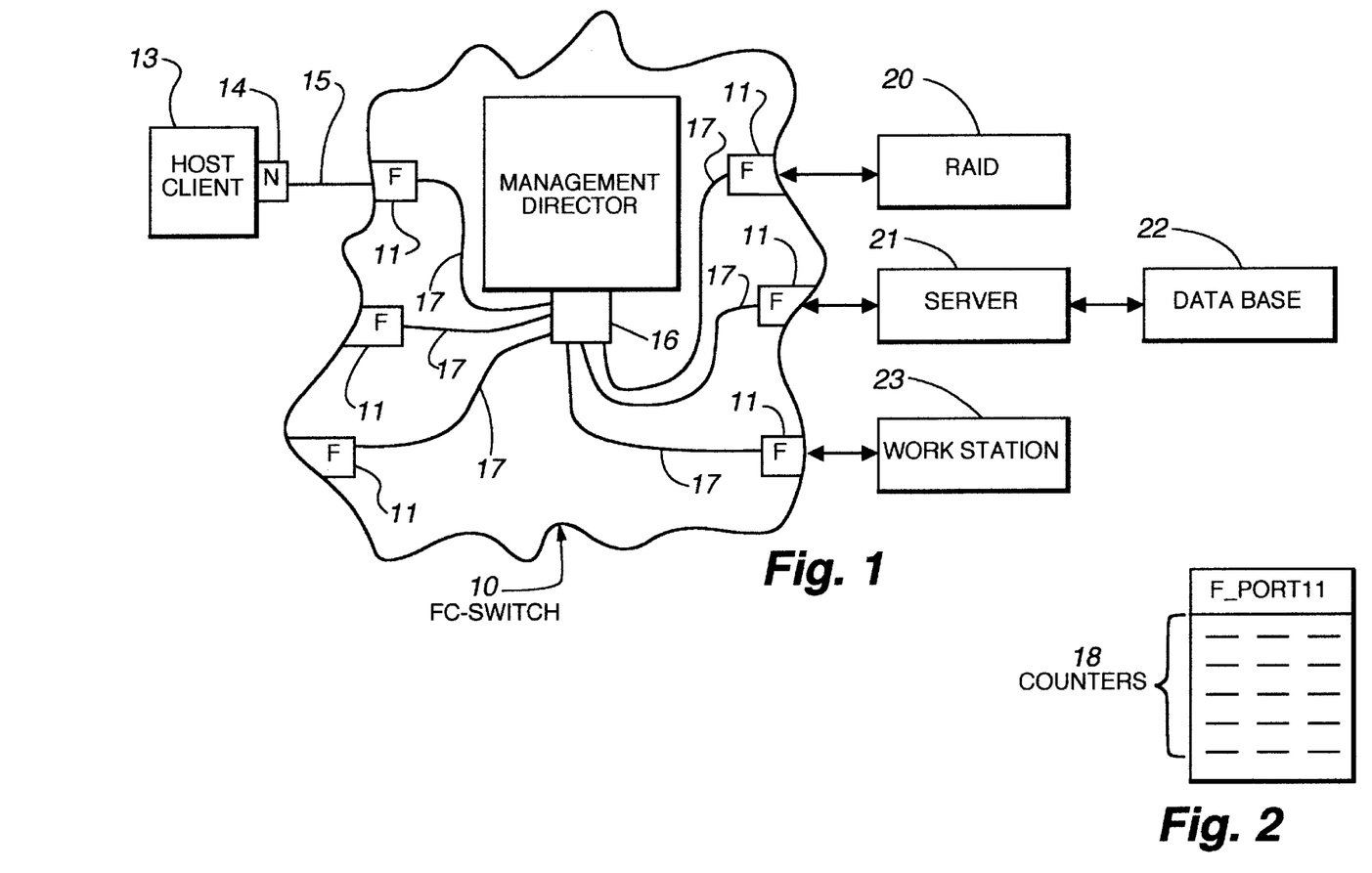
FIG. 1 is a diagrammatic showing of an embodiment of the invention, wherein a Fabric consists of a FC switch having a number of external ports, an internal management director, and an internal port.
FIG. 2 shows one of the FIG. 1 F_ports and a set of statistical port counters that are associated with the port, wherein the set of port counters are maintained within and by FIG. 1 management director.

FIG. 1 is a showing of an embodiment of the invention. While the present invention will be described relative to the monitoring of the F_ports and/or an internal port of a FC switch, the invention is not to be limited thereto since the method/apparatus of this invention finds utility relative to any port of an FC switch.

In the FIG. 1 embodiment, a FC switch 10 includes a number of external F_ports 11, a management-director 24, and an internal port 16. A host client 13 and its N_port 14 are connected to one of the F_ports 11 by way of a link 15. By way of example only, a number of systems, such as RAID 20, server 21 and its database 22, and workstation 23 are shown as being connected to various other F_ports 11.

Management director 24 includes a single internal port 16 that is directly accessible by all of the F_ports 11, but it is not directly accessibly by host client 13 or by devices 20–23.

In accordance with the invention, management director 24 generates statistical information concerning the performance of fibre channel links 17 that connect internal port 1 6 to the various F_ports 11. This statistical information is presented to host client 13 in the format of a Monitor Information Record 45 (see FIG. 4). This Monitor Information Record 45 is generated as a result of a Set Monitor Command 39 (see FIG. 3), and a subsequent Read Port Statistics Command 41 (see FIG. 3) that are received by management director 24 from host client 13.

As will be apparent from the following description, management-director 24 maintains a plurality of sets of statistical counters, each set of which corresponds to one of a like plurality of F_ports 11. In addition, management director may maintain a set of statistical counters for internal port 16.

FIG. 2 shows one of the F_ports 11. Each individual one, or selected ones, of the F_ports 11, and/or internal port 16, is provided with a set of counters 18 that are installed on management-director 24. Counters 18 are defined as statistical counters. Counts of port-operational parameters, as shown below in TABLE 1, are maintained in port counters 18.

In operation, a Set Monitor Command (see 39 of FIG. 3 and TABLE 2) is first issued in band by host client 13 to FC-switch 10. Byte fields of this Set Monitor Command are used to specify a list of statistical counters 18 and a set of associated F_ports 11 (and/or internal port) for which statistical counter records (see 50–52 and 54–56 of FIG. 4) are provided within a monitor information record 45. This monitor information record 45 is then read, in-band, by host programming when host client 13 issues an in-band Read Port Statistics Command 41 to FC switch 10.

Without limitation thereto, in an embodiment of the invention the Read Port Statistics Command 41 is issued as a function of the expiration of a predetermined time interval (see function 33 of FIG. 3) after management-director 24 has accepted a previously sent Set Monitor Command 40.

Figure 3:
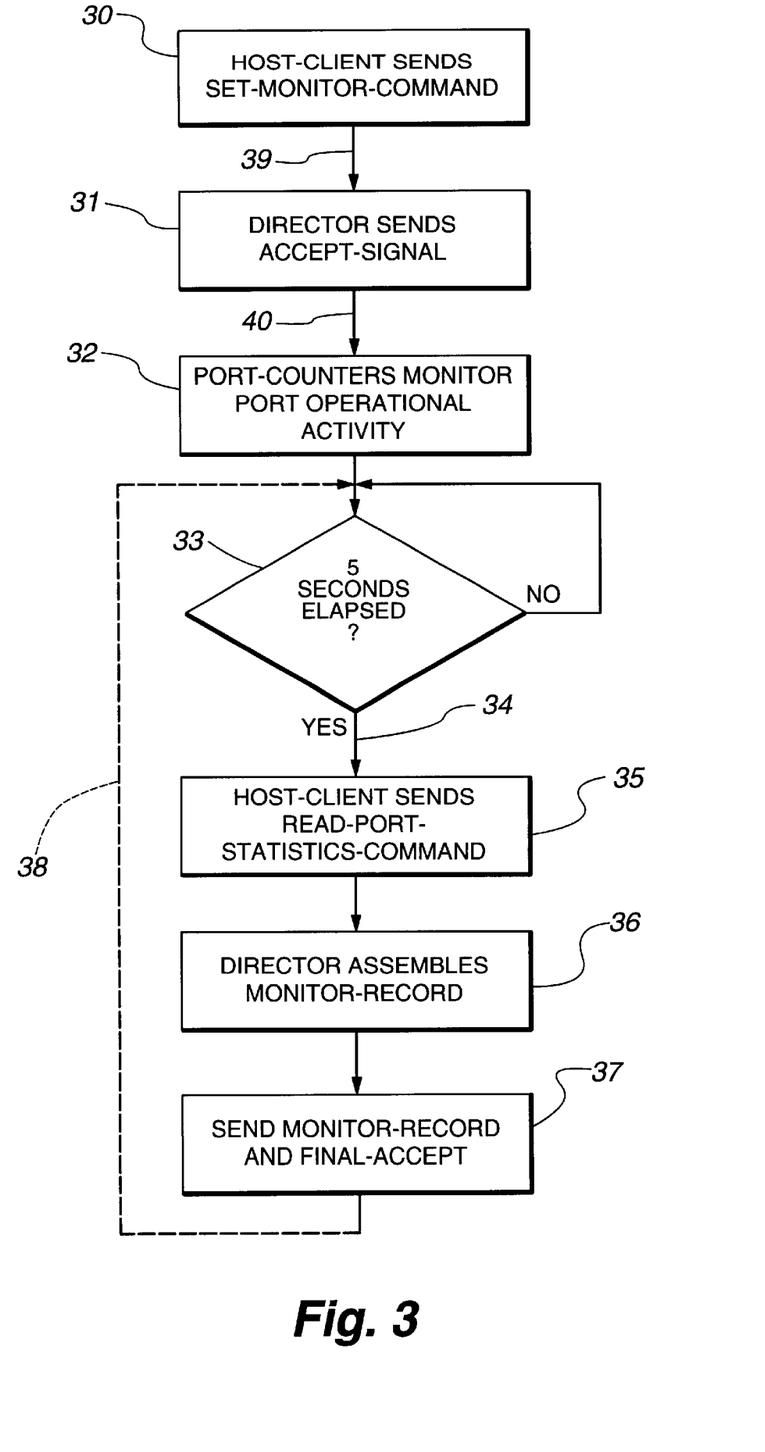
FIG. 3 is a flowchart that is useful in describing the present invention.

Statistical counters 18 are used to provide specified pieces of port-operational information that relate to the performance of each F_port 11, or to the performance of preselected F_ports 11, and/or to the performance of internal port 16. This counter information is read by virtue of host client 13 issuing an in-band Read Port Statistics Command 41 at a time that is subsequent to host client 13 issuing an in-band Set Monitor Command 39 that specifies which statistical counters 18 are to be established/read. Statistical counters 18 are reset to zero by a power on reset of FC switch 10, and may also be reset to zero by an internal reconfiguration of FC switch 10. The information content of each one of the statistical counters 18 is identified by, or is related to, a statistical counter identifier or id code (see TABLE-1) in accordance with the port parameter information that is contained therein.

Without limitation thereto, in an embodiment of the invention, all statistical counters 18 were 4-bytes in length, and could take on any value within the decimal number range from 0 to $2^{32}-1$. Any counter 18 can be read independent of the state of the associated F_port 11 or internal port 16. However, for most port states, the associated counters 18 may simply contain an initial value, or may contain the value that existed when the $F_{13}$ port was last on-line.

In an embodiment of the invention, the statistical counter identifier (contained in a counter control word of set command 39) for an individual counter 18 comprises a 2-byte hexadecimal code as shown in the following TABLE-1.

TABLE 1

| ID CODE | PORT OPERATIONAL PARAMETER |
| --- | --- |
| 09 01 | Number of words transmitted |
| 09 02 | Number of words received |
| 09 03 | Number of frames transmitted |
| 09 04 | Number of frames received |
| 09 05 | Number of class 2 frames received |
| 09 06 | Number of class 3 frames received |
| 09 07 | Number of link control frames received (FC link frames) |
| 09 08 | Number of multicast frames received |
| 09 09 | Frame pacing limit (Number of 2.5 microsecond units that frame transmission is blocked due to zero credit) |
| 09 10 | Number of disparity errors in frames |
| 09 11 | Number of CRC errors |
| 09 12 | Number of frames greater-than FC maximum |
| 09 13 | Number of frames less than FC minimum |
| 09 14 | Number of frames with bad or missing EOF |
| 09 15 | Number of disparity errors outside of frames |
| 09 16 | Number of invalid or unrecognizable ordered sets outside of frames |
| 09 17 | Number of class 3 frames discarded |
| 09 20 | Number of link failures |
| 09 21 | Number of loss of synchronization detected by port |
| 09 22 | Number of loss of signal detected by port |
| 09 23 | Number of primitive sequence protocol |
| 09 24 | Number of invalid transmission words |
| 09 25 | Number of address Id errors |
| 09 26 | Number of LRR issued by port |
| 09 27 | Number of OLS received by port |
| 09 28 | Number of OLS issued by port |

FIG. 3 is a flowchart that shows the present invention and its operation. Function 30, residing at host client 13, enables host client 13 to send a Set Monitor Command signal 39 in band to FC switch 10 and its management director 24.

As a nonlimiting and simplified example, the content of this Set Monitor Command signal 39 may comprise "present external port information, start port=5, end port=7; words transmitted=0903; words received=0904". This example content of a Set Monitor Command signal 39 operates to specify that the statistical port counters 18 of F_ports 5 through 7, inclusive, are to be monitored, that the quantity of the words transmitted by an F_port is to be identified by the identifier "0903", and that the quantity of words received by an F_port is to be identified by the identifier "0904". Without limitation thereto, in this embodiment of the invention, the word transmitted and the words received are to be periodically monitored relative to a 5-second time interval that is measured by function 33.

In a more detailed embodiment of the invention to be described relative to TABLE 2, Set Monitor Command 39 specifies;

(1) whether or not to report statistics relative to any of the external F_ports 11, (2) whether or not to report statistics relative to internal port 16, (3) whether or not to report statistics relative to all or only selected ones of the external F_ports 11, (4) the starting F_port number for which statistics are to be reported, (5) the last F_port number for which statistics are to be reported, and (6) a number of counter control words that each contain a TABLE 1 parameters to be counted, and that identify the counter control word that is last operative counter control word.

After this Set Monitor Command signal 39 is received and then accepting by management director 24 that is within FC switch 10, FC switch 10 operates to send an in band FC 4 status accept signal 40 to host client 13 at function 31. Thereafter, and during the time interval of the operation of decision function 33 within host client 13, the port counters 18 within management director 24 that were established in response to Set Monitor Command 39 operate to monitor the words transmitted activity and the words received activity of the F_ports that were specified by Set Monitor Command signal 39—in the above example, this being ports 5 through 7.

During the operation of function 32, decision function 33 within host client 12 operates to measure a given time interval which began when the in-band accept signal 40 of function 31 was received by host client 13. In the example of FIG. 3, this time interval is 5-seconds. At the end of this given and predetermined time interval, the YES output 34 of decision function 33 enables function 35 within host client 13 to send an in-band Read Report Statistics Command signal 41 to the FC switch management director 24.

Figure 4:
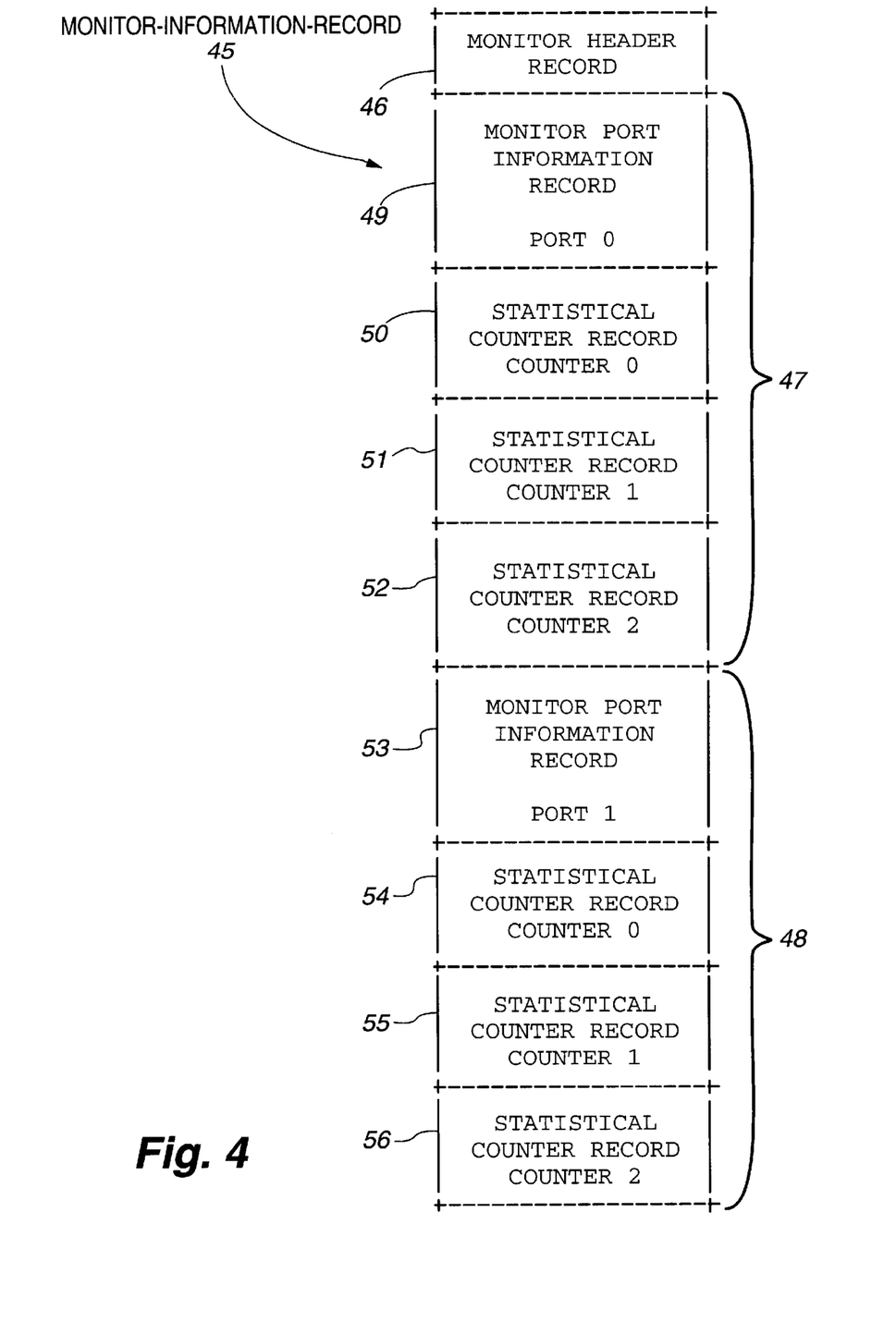
FIG. 4 is an example showing of a monitor information record for a port-0 and a port-1, wherein three statistical counters are reported on for each of the two ports.

Management director 24 within FC switch 10 now operates to interrogate the specified port counters 18 in order to obtain the words transmitted activity and the words received activity that has occurred within the 5-second timing interval of decision function 33; i.e., management director 24 assembles a Monitor Information Record 45 of FIG. 4 at function 36.

At function 37, this Monitor Information Record 45 is transmitted in-band from FC switch 10 to host client 13, followed by FC switch 10 sending an in-band FC 4 status final accept signal to host client 13.

In this example, such a Monitor Information Record 45 may comprise the three following portions;

"count provided, not last; internal port, port 5; count id=0903, count statistics=173490; count id=0904, count statistics=88551"

"count provided, not last; internal port, port 6; count id=0903, count statistics=90123; count id=0904, count statistics=721183"

"count provided, last; internal port, port 7; count id=0903, count statistics=213; count id=0904, count statistics= 1276".

Note that in this example, where ports 5 through 7 are monitored, the Monitor Information Record 45 comprises three parts, one part for each of the three ports 5 through 7.

Also note that the format of the last portion of the Monitor Information Record 45 (i.e., the portion related to port 7) indicates by use of the term "last" that the end of Monitor Information Record 45 has been reached.

Also note that in accordance with the format of Monitor Information Record 45, each individual portion of Monitor Information Record 45 indicates the related port number,. wherein count statistics that indicate the number of words transmitted by the related port is identified by the identifier "0903", and wherein count statistics that indicate the number of words received by the related port is identified by the identifier "0904".

As indicated by dotted line 38, the above-described operation of functions 33, 35, 36, 37 can be repeated any number of times in response to a Set Monitor Command 39 that is sent to FC switch 10 by function 30. In this case, the time interval measurement that is provided by decision function 33 for each cycle of functions 33, 35, 36, 37 may be the same time 5-second interval, or it may be a different time interval, as is desired. In such a recycling case 38, the statistical count that is reported by the Monitor Information Record 45 for each cycle is more preferably, but not necessarily, only the activity that occurred during a given cycle of the functions 33, 35, 36, 37.

Set Monitor Command (39 of FIG. 3)

In a more detailed embodiment of the invention, Set Monitor Command 39 of FIG. 3 transfers, in-band, a 256-byte set command from host client or host system 13 to a control device, such as FC switch 10.

The format of this command is shown below in TABLE 2, and comprises the quantity 64 of 4-byte words, made up of word 0 through word 63. As can be seen, byte 3 of word 2 specifies a starting port number, byte 3 of word 3 specifies an ending port number, and words 4 through 63 provide the quantity 60 of counter control words that are identified as counter control words 0 through 59. Counter control words 0 through 59 are provided for use in specifying port operational parameters (see TABLE 1) that are to be monitored or counted.

TABLE 2

| WORD | BYTE 0 | BYTE 1 | BYTE 2 | BYTE 3 |
|------|--------|--------|--------|--------|
| 0 | reserved | reserved | monitor control | reserved |
| 1 | reserved | reserved | reserved | reserved |
| 2 | version | reserved | reserved | starting port number |
| 3 | reserved | reserved | reserved | ending port number |
| 4 | | counter control word 0 | | |
| 5 | | counter control word 1 | | |
| — | | | | |
| 63 | | counter control word 59 | | |

Byte 2 of word 0 of the Set Monitor Command (i.e., the monitor control field) contains 8-bits, as follows;

Bit 0 provides external port information, and indicates whether statistical information is to be presented for one or more external F_ports. When bit 0 is set to 0, statistical information will not be presented for any external F_port, and the starting port/ending port (byte 3 fields of words 2 and 3) is ignored. When bit 0 is set to 1, statistical information will be presented for the external F_ports that are defined, or identified by the starting port/ending port byte 3 fields of words 2 and 3.

Bit 1 provides internal port information, and indicates whether statistical information is to be presented for internal port 16. When bit 1 is set to 0, statistical information will not be presented for internal port 16. When bit 1 is set to 1, statistical information will be presented for internal port 16.

Bit 2 is a counter set bit that indicates whether the invention is to report on all statistical counters 18, or is to report on only the counters 18 that are id-specified by counter control words 0 through 59. When bit 2 is set to 0, the invention monitor will report on only the statistical counters 18 that are id-specified by counter control words 0 through 59. When bit 2 is set to 1, the invention will report on all statistical counters 18 to subsequently occurring Read Port Statistics Commands 41 (issued in-band by host client 13), in which case, any counter control words contained in words 4 through 63 are ignored.

Bits 3 through 7 are reserved.

Byte 0 of word 2 of the Set Monitor Command (i.e., the version field or the version requested field) contains an 8-bit unsigned binary number that indicates the version that is being requested by host client 13. If the specified version is the same version that is supported by the software/firmware/hardware within management director 24, then the invention will evaluate all fields that are defined for this version. If the specified version is a higher version than that supported by management director 24, the invention will evaluate only non-reserved fields for the supported version; i.e., any fields or bits marked as reserved in the supported version will be ignored. If the specified version is a lower version than that supported by management director 24, the invention will evaluate only the fields that are defined for the lower version.

Byte 3 of word 2 of the Set Monitor Command (i.e., the starting port number) contains the port number of the first external F_port for which statistical information is requested. The invention will provide statistical information for this external F_port and for all other external F_ports having ascending port numbers up to and including the external F_port number that is indicated in the ending port number field; i.e., byte 3 of word 3.

Byte 3 of word 3 of the Set Monitor Command contains the port number of the last external F_port for which statistical information is requested.

Note that the above-mentioned port numbers are physical port numbers that identify physical F_ports, and statistical information is presented in association with these physical F_port numbers rather than in association with port addresses.

Words 4 through 63 of the Set Monitor Command (i.e., the counter control words) each contain one 32-bit counter control word wherein bits 0 through 7 contain a counter control field, bits 8 through 15 are reserved, and bits 16 through 31 comprise a statistical counter identifier or a counter id as shown in TABLE 1.

Bits 0 through 7 of a counter control word (i.e., the counter control field) are as follows;

Bit 0 indicates whether the counter control word is or is not the last active counter control word within set command 39. When set to 0, the particular counter control word is not the last active counter control word, in which case, at least one more active counter control word follows within the Set Monitor Command. When set to 1, the counter control word is the last counter control word, and any information that is contained in the remainder of the Set Monitor Command is ignored.

Bits 1 through 7 are reserved.

Bits 16 through 31 of a counter control word contain a 2-byte code that contains the statistical counter id of a counter that is to be included in the information that is read in-band as a result of subsequent Read Port Statistics Commands 41 that are issued in-band by host client 13. This counter id code specifies the port operational parameter that is to be monitored by the related counter (see TABLE 1).

A Set Monitor Command 39 is terminated, and unit check is returned to host client 13 if any of the following events occur;

(1) The Set Monitor Command 39 transfers other than 256-bytes to FC switch 10;

(2) The version field (i.e., byte 0 of word 2) is equal to or less than the version that is supported by the management director 24 of the invention, and a reserved field or a reserved bit of the monitor control record is non zero;

(3) The external F_port information (i.e., bit 0, byte 2, word 0 of the set command) is set to 1, and the starting port number (i.e., byte 3 of word 2) contains a value that is outside of the range of F_port numbers that are implemented by the counter control words (i.e., words 4 through 63);

(4) The external F_port information (i.e., bit 0, byte 2, word 0 of the set command) is set to 1, and the ending port number (i.e., byte 3 of word 3) contains a value that is outside of the range of port numbers that are implemented by the counter control words (i.e., words 4 through 63);

(5) The external F_port information (i.e., bit 0 of the monitor control record) and the internal F_port information (i.e., bit 1 of the monitor control record) are both set to 0.

If none of the above conditions result in the in-band presentation of a unit check to host client 13, host client 13 receives an in-band FC 4 status accept signal 40 from FC switch 10.

Read Port Statistics Command (see 41 of FIG. 3)

Read Port Statistics Command 41 of FIG. 3 causes a specified variable number of bytes, for example N-bytes, to be transferred in-band from the monitor device, in this case FC switch 10, to host programming that is within host client 13. The data contained in this in-band switch to host transfer is a Monitor Information Record 45 that will be described relative to FIG. 4.

In-band Read Port Statistics Command 41 must be preceded by an in-band Set Monitor Command 39. If multiple Set Monitor Commands 39 preceded a last received Set Monitor Command 39, Monitor Information Record 45 will be based upon the content of the last received Set Monitor Command 39.

If the byte count N that is specified by a given Read Port Statistics Command 41 is greater than the byte count that was requested by the corresponding in-band Set Monitor Command 39, then the Monitor Information Record 45 will be truncated after N bytes, and only N bytes will be transferred in-band to host client 13.

If the byte count N that is specified by a given Read Port Statistics Command 41 is less than the byte count that was requested by the corresponding in-band Set Monitor Command 39, then a sufficient number of pad bytes are appended to the Monitor Information Record 45 in order to ensure that N bytes are transferred in-band to host client 13. Each such pad byte comprises hexadecimal "00".

If a given in-band Read Port Statistics Command 41 is received within a minimum predetermined time interval TI after completion of a FC switch power on reset, or after completion of an internal reconfiguration of FC switch 10, then a Device End status signal will be presented in-band to host client 13 and its channel, thus causing the channel to retry the given Read Port Statistics Command 41.

A given Read Port Statistics Command 41 is terminated, and no transfer of a Monitor Information Record 45 occurs when any of the following events occur;

(1) The byte count N that is specified by the given Read Port Statistics Command 41 is less than the size of a header record size within the resulting Monitor Information Record 45;

(2) The given Read Port Statistics Command 41 was not preceded by at least one Set Monitor Command 39.

If none of the above conditions that cause the in-band presentation of a unit check status signal to host client 13 occur, then normal ending status is presented in-band to host client 13 and its channel.

When normal ending status has been accepted by the channel, an elapsed time overflow bit of the FC switch monitor header status field is reset to 0, an elapsed time counter at host client 13 is reset to zero (i.e., to hexadecimal "0000"), and the elapsed time counter begins to measure a predetermined time interval T2 as the elapsed time counter begins to increment or count upward from zero.

Monitor Information Record 45 (see FIG. 4)

The above-mentioned Monitor Information Record 45 that is sent in-band by director 12 to host client 13 by means of FIG. 3 function 37 consists of one header record, one or more port information records, and for each individual port information record, one or more statistical counter records.

A Monitor Information Record 45 always starts with a header record, followed by a port information record for a particular F_port, followed by all of the statistical counter records that pertain to that particular F_port. Monitor Information Records 45 can be presented in any order. Statistical counter records that pertain to a particular F_port can also be presented in any order, but they must immediately follow the monitor information record for the F_port to which the statistical counter record 45 or records apply.

FIG. 4 provides an example of a Monitor Information Record 45 for two F_ports, i.e., F_port 0 and F_port 1, with three statistical counters being provided for each of the two F_ports, i.e., two counters 0, two counters 1 and two counters 3. Monitor header record 46 precedes the portions 47 and 48 of Monitor Information Record 45 that respectively pertain to F_port 0 and F_port 1.

Portion 47 of Monitor Information Record 45 that pertains to F_port 0 includes a port information record 49, a counter record 50 that pertains to a counter 0 that is associated with port 0, a counter record 51 that pertains to a counter 1 that is associated with port 0, and a counter record 52 that pertains to a counter 2 that is associated with port 0.

Portion 48 of Monitor Information Record 45 that pertains to F_port 1 includes a port information record 53, a counter record 54 that pertains to a counter 0 that is associated with port 1, a counter record 55 that pertains to a counter 1 that is associated with port 1, and a counter record 56 that pertains to a counter 2 that is associated with port 1.

Monitor Header Record (see 46 of FIG. 4)

The format of the above-mentioned monitor header record 46 consists of 4 words, each word having 4 bytes, as shown in TABLE 3 below.

TABLE 3

| WORD | BYTE 0 | BYTE 1 | BYTE 2 | BYTE 3 |
|---|---|---|---|---|
| 0 | flag | count | status | reserved |
| 1 | reserved | reserved | -elapsed time counter- | |
| 2 | version supported | version presented | reserved | reserved |
| 3 | --------------sequence number------------------- | | | |

The flag field of a monitor header record 46 (i.e., byte 0 of word 0) identifies the format of the information that is contained in the remainder of the record. For a monitor header record 46 this flag is set to hexadecimal The count field of a monitor header record 46 (i.e., byte 1 of word 0) indicates the number of words in the record. For a monitor header record this count field is set to hexadecimal "04".

The status field of a monitor header record 46 (i.e., byte 2 of word 0) contains 8 bits, as follows;

Bits 0 and 1 of the status field are reserved.

Bit 2 of the status field relates to elapsed time overflow. When bit 2 is set to 1, an indication is provided that the time that has passed since statistical counters 18 were last read exceeds a given number of time units; for example, 65,535 time units, where one time unit equals 100-milliseconds (hexadecimal "FFFF" elapsed counter time units. In this case, the elapsed counter has overflowed, and any information in the elapsed time counter field (i.e., bytes 2 and 3 of word 1) will not correctly indicate the time that has elapsed since statistical counters 18 were last read. When bit 2 is set to 0, the elapsed time since statistical counters were last read is less than 65,536 time units. Bit 2 is reset to 40 when (1) a Read Port Statistics Command 41 has completed and a normal ending status has been accepted by the channel, (2) an internal FC switch reconfiguration has taken place, or (3) a FC switch power on reset has completed.

Bit 3 of the status field indicates whether the set of statistical counters 18 included in this Monitor Information Record 45 are the entire set of statistical counters 18, or a subset of the entire set. When set to 1, the entire set of counters 18 has been included in the related Monitor Information Record 45. When set to 0, a subset of the entire set has been included in the related Monitor Information Record 45.

Bit 4 of the status field indicates whether the byte count that is specified for the Read Port Statistics Command 41 (i.e., byte count N) was sufficient for the size of the Monitor Information Record 45 that was requested by the related Set Monitor Command 39. When bit 4 of the status field is set to 0, byte count N sufficient, and all available information will be transferred to host client 13. When bit 4 of the status field is set to 1, byte count N was insufficient for the size of the Monitor Information Record 45 that was requested by the related Set Monitor Command 39, and some requested information will not be transferred.

Bits 5 through 7 of the status field are reserved.

The elapsed time counter field of a monitor header record 46 (i.e., bytes 2 and 3 of word 1) contains a 16-bit unsigned binary number that indicates the number of time units that have elapsed since the last Read Port Statistics Command 41 was successfully executed, where one time unit equals 100-milliseconds. When the elapsed time counter field is all zeros, either the elapsed time counter has overflowed, or the data within the elapsed time counter field is being read by the first in-band Read Port Statistics Command 41 that follows a FC switch power on reset, or an internal reconfiguration. The elapsed time counter field of a monitor header record 46 is reset to hexadecimal "0000", and it starts to increment upward whenever a Read Port Statistics Command 41 completes and normal ending status has been accepted. The elapsed time counter field of a monitor header record 46 is reset to hexadecimal "0000" and stops incrementing when (1) the elapsed time exceeds 65535 time units (i.e., the elapsed time counter times out), (2) an internal FC switch reconfiguration has taken place, or (3) a FC switch power on reset has completed.

The version supported field of a monitor header record 46 (i.e., byte 0 of word 2) contains an 8-bit unsigned binary number that indicates the Monitor Information Record 45 version that is supported by the software/firmware/hardware currently running in management director 24.

The version-presented field of a monitor header record 46 (i.e., byte 1 of word 2) contains an 8-bit unsigned binary number that indicates the Monitor Information Record 45 version that is being presented to the firmware currently running in management director 24. If host client 13 has requested a lower version than currently supported, then the information record format of the lower version is presented, and this version presented field is set to indicate the lower version that was requested. If host client 13 has requested a higher version than currently supported, then the version currently supported is presented, and this version presented field is set to indicate the currently supported version.

The sequence number field of a monitor header record 46 (i.e., bytes 0–4 of word 3) is a 32-bit unsigned binary number that indicates the sequence number for the statistical information that is provided in this Monitor Information Record 45. Sequence numbers are used sequentially, and the sequence number of the next Monitor Information Record 45 will be one greater than the sequence number of the current Monitor Information Record 45. Sequence numbers will wrap from hexadecimal "FFFF FFFF" to hexadecimal "0000 0000" without notification to programming within host client 13. Sequence numbers are initialized to "0000 0000" whenever a FC switch power on reset or internal reconfiguration takes place.

Monitor Port Information Record (see 49 and 53 of FIG. 4)

A monitor port information record 49, 53 immediately precedes the set of counter statistical records for a given port, as shown in FIG. 4. This monitor port information record 49, 53 identifies the port, and provides information concerning the state of the port. The following TABLE 4 shows the format of a monitor port information record.

TABLE 4

| WORD | BYTE 0 | BYTE 1 | BYTE 2 | BYTE 3 |
|------|--------|--------|--------|--------|
| 0 | flag | count | status | reserved |
| 1 | | port descriptor | | |
| 2 | | reserved | | port number |
| 3 | | reserved | | |

The flag field, i.e. byte 0 of word 0, identifies the format of the information that is contained in the remainder of the monitor port information record. For a monitor port information record, this flag field contains hexadecimal "61".

The count field, i.e. byte 1 of word 0, indicates the number of words that are in a monitor port information record. This field contains hexadecimal "04".

The port descriptor field, i.e. word 1, is defined as follows: When bit 2 of the status field (i.e., bit 2 of byte 2 of word 0) is a "0", then the port descriptor field (i.e., word 1) contains the 32-bit port descriptor for the port that is identified in the port number field (i.e., in byte 3 of word 2). When bit 2 of the status field (i.e., bit 2 of byte 2 of word 0) is a "1", then the port descriptor field (i.e., word 1) contains all zeros.

The port number field (i.e., byte 3 of word 2) contains the port number of the port that is described by the particular monitor port information record 49, 53.

The status field, i.e. byte 2 of word 0, contains 8 bits that are defined as follows.

- Bit 0 indicates whether statistical counters for the described port follows the particular monitor port information record 49, 53. When bit 0 is set to "1", statistical counters are provided. When bit 0 is set to "0", this bit indicates that management director 24 is unable to produce statistical counter records for this port, in which case, the current monitor port information record will be immediately followed by another monitor port information record unless bit 7 is set.
- Bit 1 indicates whether the monitor port information record is the last monitor port information record in the current Monitor Information Record 45. When bit 1 is set to "0", the current monitor port information record is not the last monitor port information record, and at least one additional monitor port information record will follow the last statistical counter record that relates to the current monitor port information record. When bit 1 is set to "1", the current monitor port information record is the last. monitor port information record in the current Monitor Information Record 45, and no additional monitor port information records will follow.
- Bit 2 indicates whether the port identified by the port number (i.e., by byte 3 of word 2) has an assigned port address. When bit 2 is set to "0", a port address assignment exists, and word 1 contains the port descriptor of the port. When bit 2 is set to "1", a port address assignment does not exist, and word 1 contains all zeros.
- Bit 3 indicates whether this monitor port information record identifies an external port or an internal port. When bit 3 is set to "0", the current monitor port information record describes an external port. When bit 3 is set to "1", the monitor port information record describes an internal port. In either case, the port number field (i.e., byte 3 of word 2) contains the port number that identifies the external/internal port.
- Bits 4–7 are reserved.

Status of Management Director 24

The status of management director 24 is reported in-band to host client 13 by way of status bit combinations.

A command retry status of management director 24 is presented in order to indicate that the channel should retry the last command that was presented to management director 24. A command retry status is reported by using a status field in which status modifier, channel end, and unit check are all set. Under certain conditions, busy may also be set. A command retry status is presented when management director 24 is unable to immediately provide the data that is required by a read type command. Under this circumstance, command retry status is presented with the status modifier, channel end and unit check bits all set. Later, when the required data becomes available, device end status is sent. A command retry status may be presented in response to a Read Port Statistics Command 41.

A device end status of management director 24 is presented when management director 24 is ready to accept a command to which a command retry status had previously been presented. A device end status is identified by a status field in which only the device end bit is set. A device end status is also presented after requested data has become available following the presentation of a command retry status.

Management Director 24 Sense Bytes

Management director 24 sense bytes are used to send in-band reject error codes to host client 13. Sense byte 5 definitions of command rejection hexadecimal error codes are shown in the following TABLE 5.

TABLE 5

| CODE | DEFINITION |
|------|------------|
| 10 | Count field incorrect 0. The count field of a write type command was not correctly defined for the defined command code. |
| 11 | Count field incorrect 1. The count field of a read type command was not correctly defined for the defined command code. |
| 77 | Nonzero value in a reserved field. The information transferred by the rejected command contained a nonzero value in a reserved field or a nonzero value in a reserved bit. |
| D0 | Invalid monitor control specification 0. The rejected command attempted to specify an invalid starting port number. |
| D1 | Invalid monitor control specification 1. The rejected command attempted to specify an invalid ending port number. |
| D2 | Invalid monitor control specification 2. The rejected command requested port information but did not specify any port. Either the presented external port information or the presented internal port information bit must be set. |
| D3 | A Read Port Statistics Command 39 was not preceded by a Set Monitor Command 39 in the same command chain. |

From the above description it can be seen that a method/apparatus is provided by this invention whereby host client 13 is enabled to secure predetermined operational information or statistics relative to predetermined ports of FC switch 10.

More specifically, Set Monitor Command 39 is generated at host client 13 and then sent in-band to FC switch 10. The information content of Set Monitor Command 39 (TABLE 2) specifically defines the ports of FC switch 10 for which operational parameters are to be monitored or counted (TABLE 2, bytes 3 of words 2 and 3). In addition, the information content of Set Monitor Command 39 specifically defines which operational parameters are to be monitored by way of 2-byte code counter identifiers (TABLE 1) that are contained in counter control words 0 through 59 of set command 39 (TABLE 2).

This Set Monitor Command 39 (TABLE 2) is received by FC switch 10. In response to receiving Set Monitor Command 39, switch 10 establishes the requested statistical counters 18 that are to monitor port operational parameters in accordance with the received ones of the counter identifiers (TABLE 1).

An accept signal 40 is then sent in-band to host client 13, and a period of port monitoring begins. After a time interval, for example the 5-second time interval of function 33, Read port statistics Command 41 is sent in-band to FC switch 10.

FC switch 10 now operates to generate a Monitor Information Record 45 (FIG. 4) in accordance with the count content of the statistical counters 18 that were established in response to Set Monitor Command 39. This Monitor Information Record 45 contains one field (47, 48, etc.) for each of the ports that were specified by Set Monitor Command 39, and each of the port fields contains a count field (50–52, etc. and 54–56, etc.) that contains port-operational count data for the port-operational parameters that were specified by the counter identifiers contained in Set Monitor Command 39.

This Monitor Information Record 45 is then sent in-band to host client 13. If desired, recycling of the process may be provided as shown at 38 of FIG. 3.

The invention has been described in detail while making reference to embodiments thereof. Since it is known that others skilled in the art will, upon learning of this invention, readily visualize yet other embodiments that are within the spirit and scope of this invention, the above detailed description is not to be taken as a limitation on the spirit and scope of this invention.

What is claimed is:

1. A method enabling a host computer to obtain predetermined operational statistics relative to specified operating parameters of a plurality of ports of a fibre channel switch, wherein said host computer is connected to at least one port of said fibre channel switch, the method comprising the steps of:

providing a management director at said fibre channel switch;

generating a set command at said host computer;

said set command defining one or more ports of said fibre channel switch for which operational statistics are to be obtained;

said set command also defining one or more port operating parameters that are to be obtained relative to said defined one or more ports of said fibre channel switch;

transmitting said set command in-band to said management director;

responding to said set command at said management director and establishing one or more one statistical counters in accordance for each of said defined one or more ports of said fibre channel switch in accordance with said one or more defined port operating parameters;

said one of more statistical counters thereafter operating to monitor said defined port operating parameters;

generating a read command at said host computer;

transmitting said read command in-band to said management director;

responding to said read command at said management director and generating a port information record in accordance with a count content of each of said defined one or more statistical counters;

said port information record containing a statistical counter record for each of said established one or more one of more statistical counters;

said statistical counter records recording port operating parameters in accordance with said defined port operating parameters; and transmitting said port information record in-band to said host computer.

2. The method of claim 2 including the steps of:

responding to said set command at said management director and generating an accept signal;

transmitting said accept signal in-band to said host computer;

responding to said accept signal at said host computer and beginning the measurement of a predetermined time interval;

sensing an end of said predetermined time interval; and generating said read command in response to sensing said end of said predetermined time interval.

3. The method of claim 2 including the steps of:

responding to said port information record and repeating said beginning of measurement of a predetermined time interval in response to said host computer receiving said port information record.

4. Apparatus enabling a host computer to monitor specified port operating parameters relating to specified ports of a fibre channel switch, comprising:

in-band circuit means interconnecting said host computer with a port of said switch;

a management director within said switch;

first signal generating means at said host computer for sending an in-band set command to said management director;

said set command specifying ports of said switch for which port operating parameters are to be counted;

said set command defining a number of statistical counters for each of said specified ports of said switch;

said set command specifying a port operating parameter that is to be monitored by each individual one of said statistical counters;

first control means at said switch for responding to said set command and operating to establish said specified number of statistical counters at said switch;

said established statistical counters thereafter operating to monitor said specified ports and said specified port operating parameters for each of said specified ports;

second signal generating means at said host computer for sending an in-band read command to said management director;

second control means at said switch for responding to said read command and operating to generate a port information record;

said port information record containing a statistical count for each of said statistical counters; and transmitting means at said switch for sending said port information record in-band to said host computer.

5. The apparatus of claim 4 including:

means as said switch for responding to said set command and operating to send an accept signal in-band to said host computer;

means at said host computer for responding to said accept signal and for beginning the measurement of a predetermined time interval; and third signal generating means at said host computer for responding to an end of said predetermined time interval, and for sending said read command in band to said switch.

6. The apparatus of claim 5 including:

means at said host computer responding to said port information record and repeating said measurement of said predetermined time interval, such that a port information record is sent in-band to said host computer relative to the end of each repeated measurement of said predetermined time interval.

7. A method enabling a host computer to obtain port-operating parameters relative to predetermined ports of a fibre channel switch, wherein said host computer is in-band connected to a port of said switch, the method comprising the steps of:

generating a set command at said host computer;

said set command specifically defining ports of said switch for which port operating parameters are to be obtained;

transmitting said set command in-band from said host computer to said switch;

responding to said set command at said switch and establishing monitoring means at said switch to monitor port operating parameters of said specifically defined ports of said switch;

generating a read command at said host computer;

transmitting said read command in-band from said host computer to said switch;

responding to said read command at said switch and generating a port information record having a data content relating to said monitoring means; and transmitting said port information record in-band from said switch to said host computer.

8. The method of claim 7 including the steps of:

responding to said set command at said switch and generating an accept signal;

transmitting said accept signal in-band from said switch to said host computer;

responding to said accept signal at said host computer and starting the measurement of a time interval;

sensing an end of said time interval; and generating said read command in response to sensing said end of said time interval.

9. The method of claim 8 including the step of:

repeating said measurement of a time interval and providing a port information record for each repetition of said measurement of a time interval.

10. A method of counting the number of pre-specified events that occur at the switch ports of a fibre channel switch within a given time interval, comprising the steps of:

providing a host that is connected to a switch port by way of an in-band connection;

generating a set command at said host to specify a plurality of switch ports for which event counts are to be obtained, and to specify events for which event counts are to be obtained for individual ones of said plurality of ports;

sending said set command to said fibre channel switch by way of said in-band connection;

responding to said set command at said fibre channel switch, establishing port counters at said individual ones of said plurality of ports, to thereby count occurrences of said specified events at said individual ones of said plurality of ports, and generating an accept signal;

sending said accept signal to said host by way of said in-band connection;

responding to said accept signal at said host and beginning measurement of said given time interval;

sensing an end of said given time interval at said host and generating a read command;

sending said read command to said fibre channel switch by way of said in-band connection;

responding to said read command at said fibre channel switch and generating a port report from a content of said plurality of port counters; and sending said port report to said host by way of said in-band connection.

11. The method of claim 10 wherein said port report operates to report a number of occurrences of each of said specified events for said individual ones of said plurality of ports.

12. The method of claim 10 including the steps of:

testing said set command at said fibre channel switch to determine conformance to set command rules;

sending said accept signal to said host by way of said in-band connection when said set command conforms to said set command rules;

generating a reject signal at said fibre channel switch when said set command does not conform to said set command rules; and sending said reject signal to said host by way of said in-band connection.

13. The method of claim 12 wherein said port report reports a number of occurrences of each of said specified events relative to said individual ones of said plurality of ports.

14. The method of claim 12 wherein said set command includes a beginning port number/ending port number range of switch ports for which event counts are to be obtained, and wherein said set command rules include acceptable switch port numbers for which event counts can be obtained.

15. An in-band transmission method of determining specified port operating parameters that may occur at a plurality of switch ports of a fibre channel switch within an operating interval, comprising the steps of:

providing a host that is connected to a switch port by way of an in-band connection;

generating a binary set command having a fixed byte length at said host;

said set command specifying ports for which port operating parameters are to be monitored;

said set command including a list of control words, each of which specifies a port operating parameter for which occurrences are to be monitored;

a last control word in said list indicating that a remainder of said fixed byte length set command can be ignored;

transmitting said fixed byte length set command to said switch by way of said in-band connection;

responding to said set command at said switch and establishing monitoring means at each of said specified ports to monitor occurrences of said specified port operating parameters at said specified ports;

determining an end of said operating interval at said host and sending a binary read command to said switch by way of said in-band connection;

said read command requesting that a binary port report having N-bytes be transferred in-band from said switch to said host;

responding to said read command at said switch and generating a binary port report from said monitoring means, a byte length of said port report being dependent upon said switch ports and said list of control words contained in said set command;

when said byte length of said port report is equal to N-bytes, transmitting said port report to said host by way of said in-band connection;

when said byte length of said port report is greater than N-bytes, truncating said port report and transmitting said truncated port report to said host by way of said in-band connection; and when said byte length of said port report is less than N-bytes, padding said port report to have a byte length of N-bytes, and transmitting said padded port report to said host by way of said in-band connection.

16. The method of claim 15 including the steps of:

sending a binary accept signal to said host by way of said in-band connection upon said switch establishing said monitoring means; and responding to said accept signal at said host and beginning measurement of said operating interval.

17. The method of claim 16 including the steps of:

testing said set command at said switch to determine conformance to set command rules;

sending said accept signal to said host by way of said in-band connection when said set command conforms to said set command rules; and generating a reject signal at said switch when said set command does not conform to said set command rules, and sending said reject signal to said host by way of said in-band connection.

18. The method of claim 15 wherein said set command includes the port numbers of ports for which port operating parameters are to be monitored, and wherein said set command rules include acceptable port numbers for which port operating parameters can be obtained.

19. In a computer system having a host that is connected to at least one port of a fibre channel switch, having a plurality of computer devices connected to other ports said switch, and wherein data information is exchanged between said host and said computer devices utilizing an in-band communication path that includes said switch, a method of determining certain port operations that occur at certain ports of said switch, comprising the steps of:

generating a set command at said host, said set command requesting that occurrences of said certain port operations be monitored at said certain ports of said switch;

transmitting said set command from said host to said switch using said in-band communication path;

responding to said set command at said switch and establishing monitoring means to monitor occurrences of said certain port operations at said certain ports of said switch;

after an operational period, generating a read request at said host;

transmitting said read command from said host to said switch using said in-band communication path;

responding to said read command at said switch and generating a port report from an occurrence content of said monitoring means; and transmitting said read report from said switch to said host using said in-band communication path.

20. The method of claim 19 wherein said port report correlates occurrences of said certain port operations to individual ones of said certain ports of said switch.

21. The method of claim 20 wherein said step of responding to said set command at said switch includes the steps of:

generating an accept command at said switch; and transmitting said accept command from said switch to said host using said in-band communication path.

22. The method of claim 21 wherein said step of generating a read request at said host comprises the steps of:

responding to said accept command and beginning the measurement of a predetermined time period; and generating said read request at said host after expiration of said predetermined time period.

23. The method of claim 22 including the steps of:

providing set command rules at said switch;

testing said set command at said switch using said set command rules;

generating said accept command at said switch when said testing of said set command determines that said set command conforms to said set command rules;

generating a reject command at said switch when said testing of said set command determines that said set command does not conform to said set command rules; and transmitting said reject command from said switch to said host using said in band communication path when said testing of said set command determines that said set command does not conform to said set command rules.

24. A computer system having a fibre channel switch having a plurality of ports, a host that is connected to at least one port of said switch, a plurality of computer devices connected to other ports said switch, a plurality of port counters associated with each port of said switch, and an in-band communications path interconnecting said host and said computer devices by way of said switch, apparatus for determining specified port operations that occur at specified ports of said switch, comprising;

set command means at said host for generating a set command and for transmitting said set command to said switch;

said set command specifying ports that are to be monitored, port operations that are to be monitored at said specified ports, and port counters at each of said specified ports that individually correspond to each of said port operations that are specified for monitoring at each of said specified ports;

accept means at said switch for generating an accept signal and for transmitting said accept signal to said host;

read request means at said host responsive to said accept signal for thereafter generating a read request and for transmitting said read request to said switch; and port report means at said switch responding to said read command and generating a port report from a content of said specified port counters and for transmitting said read report to said host;

said read report grouping each respective specified port with a content of specified port counters that correspond to each respective port.

* * * * *